Feb. 22, 1938.    K. J. WERSÄLL    2,109,405
FRICTION CLUTCH
Filed Aug. 4, 1937

Inventor
Karl J. Wersall
by [signature]
Atty

Patented Feb. 22, 1938

2,109,405

UNITED STATES PATENT OFFICE 2,109,405

FRICTION CLUTCH

Karl Johan Wersäll, Alsten, Sweden

Application August 4, 1937, Serial No. 157,428
In Sweden December 31, 1934

2 Claims. (Cl. 192—105)

The invention relates to centrifugal friction clutches of the kind in which the shoes are laterally turnable and are driven by studs engaging with recesses within them.

One object of the invention is to ensure that the degree or intensity of pressure between the friction surfaces shall be maintained substantially equal over the whole area of a shoe. In clutches as hitherto known, the driving and frictional forces acting on each shoe have set up a turning moment tending to press the leading edge of the shoe against the friction drum or track, with the result that the pressure at the leading part of the shoe has been considerably higher than that at the trailing part. A further object of the invention is therefore to provide a shoe which is suitable for a clutch which is to drive in both directions and which ensures a substantially even distribution of pressure over the whole friction surface of the shoe, irrespective of the direction in which it is rotating.

According to the present invention, the contact surface of the recess, in the shoe, with which the driving stud engages is so inclined to the radial centre line of the shoe that a line perpendicular to, and passing through the centre of, said surface passes through, or near, the point of action of the frictional forces acting on the shoe. Further, according to the invention, the driving stud acts near the leading end of its respective shoe so that the greater part of the shoe is trailing, and, in order that the shoe may be employed for driving in either direction, the recess within which the stud engages is in the form of a slot or groove extending almost from end to end of the shoe. Each end of the slot may be provided with the special contact surface for the stud as above mentioned.

One form of the invention is illustrated by way of example in the accompanying drawing, in which:—

Figure 1:
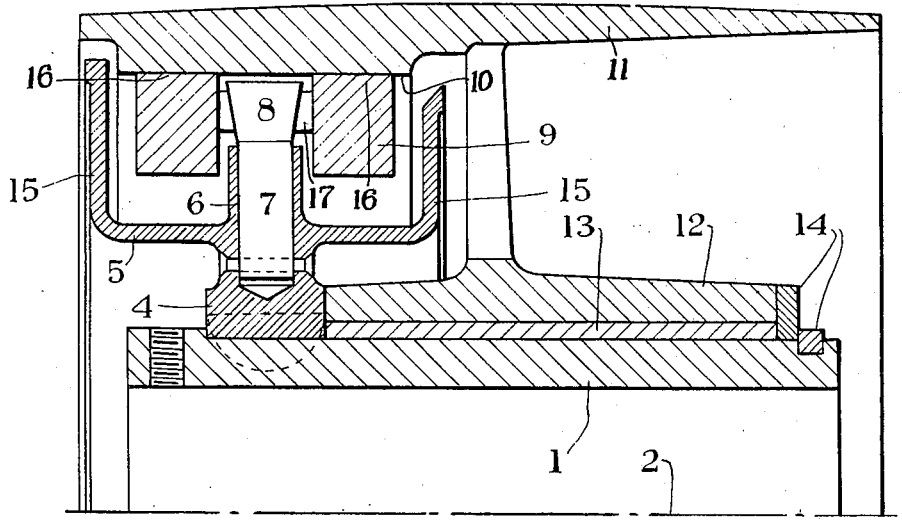
Figure 2:
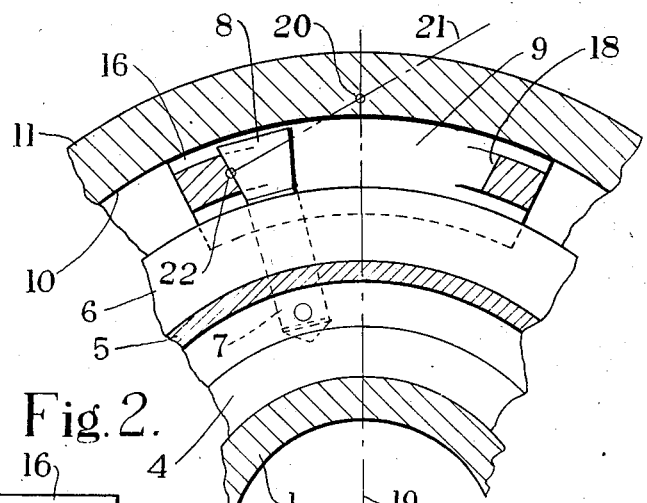

Figure 1 is a side sectional elevation through half of a centrifugal clutch,

Figure 2 being a somewhat diagrammatic cross-sectional elevation of a portion of the clutch corresponding thereto.

Figure 3:
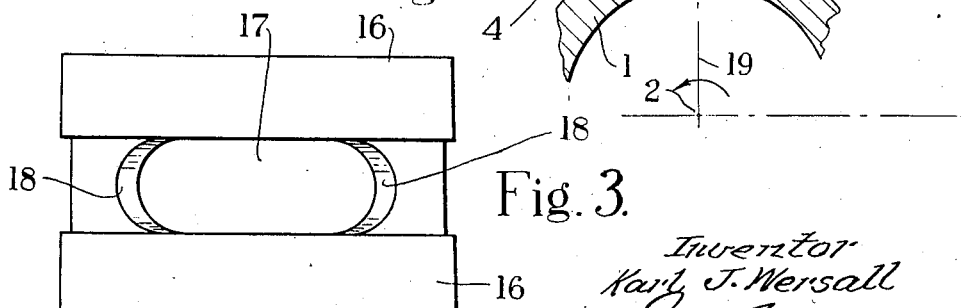

Figure 3 is a plan of a shoe.

Referring to the drawing, a sleeve 1 having its centre line at 2, can be secured to a driving shaft. A driver 4 is keyed to the sleeve and is in the form of a drum 5 provided with a central rib or web 6, in which driving studs 7 are secured. The driving studs are equally spaced around the driver and have contact heads 8 in the form of frustra of inverted cones. Each stud drives its own clutch shoe 9, which is free to move outwards under the action of centrifugal force until arrested by the friction track 10. Each shoe can also rock or turn laterally about its pin. The friction track 10 is formed as a race inside a pulley 11, the boss 12 of which is rotatably mounted on a bush 13 on the sleeve, the boss and bush being retained in place by the rings 14. In order that the clutch shoes shall be enclosed, the drum 5 of the driver is provided with flanges 15.

Each shoe 9 is of a segmental form having two bearing strips 16 which make contact with the track or race 10. The recess within which a driving stud engages is in the form of a slot 17 having a contact surface 18 at each end.

Referring to Figure 2, as the shoe 9 is symmetrical about its radial centre line 19, the point of action of the frictional forces acting on the shoe lies on the centre line and is located at the point 20 just outside the surface of the track 10, this point 20 coinciding with the intersection of tangents to the shoe periphery, representing the resultants of forces on each side of the radial center line 19. A normal 21 to the contact surface 18, drawn at the centre point 22 of the surface, passes through the point of action 20.

In this arrangement, the line of the driving force exerted on the shoe by the stud passes through the point of action of the frictional forces, and the greater part of the shoe trails behind the driving stud. The tendency for the leading edge of the shoe to rock outwardly about the stud is reduced, so that the degree of pressure is substantially the same over the whole area of the bearing strips 16. The uniform distribution of pressure over the whole area of a shoe effects a substantial increase in the life of the shoes and of the friction track.

The provision of the long slot 17 with a properly formed contact surface 18 at each end permits the advantages of the invention to be obtained in a reversible clutch, irrespective of the direction of the drive.

In the case of a uni-directional clutch, the slot 17 need only be long enough to enable the shoe to move with perfect freedom on its stud. In this case, considering a clutch driving in an anti-clockwise direction as in Figure 2, the point of action would lie to the right of the geometric centre line of the shoe owing to the difference in the position of the centre of gravity of the more solid shoe.

In practice, it is found that the normal 21 may deviate up to 15° on either side of the point 20 without serious loss of efficiency of the clutch.

The mere driving of the shoes near their leading edges in itself does much to distribute evenly the pressure over the whole area of the shoes. The provision of a slot extending over a substantial length of the shoe is of great utility in a reversible clutch as, irrespective of the direction of rotation, the shoes can be driven near their leading edges with a substantial portion of the shoes trailing. A more or less uniform distribution of pressure is thus obtained in both directions of rotation.

When driving studs having cylindrical instead of conical heads are employed, the studs are inserted angularly or tangentially, that is, not radially, into the driver in order that the contact surfaces of the shoes shall be correctly inclined for the purpose of the invention.

I claim:

1. A centrifugal clutch comprising a friction track, a driving member, studs carried by said driving member, shoes adapted to be driven by said studs and to engage frictionally with said track under centrifugal action, each of said shoes having an elongated recess for the reception of a stud and a contact surface for driving engagement by the stud, said contact surface being so inclined to the radial center line of the shoe that a line perpendicular to and passing through the center of said surface intersects said radial center line at a point adjacent to but beyond said friction track.

2. A centrifugal clutch comprising a friction track, a driving member, studs carried by said driving member, shoes adapted to be driven by said studs and to engage frictionally with said track under centrifugal action, each of said shoes having an elongated slot extending substantially from end to end of the shoe and a contact surface at each end of said slot for alternative driving engagement by the stud received in said slot, to render the clutch reversible, each of said contact surfaces being so inclined to the radial center line of said shoe that a line perpendicular to and passing through the center of said surface intersects said radial center line at a point adjacent to but beyond said frictional track.

KARL JOHAN WERSÄLL.